W. M. WOODBURY.
GRINDING MILL.

No. 185,200. Patented Dec. 12, 1876.

Witnesses:
Donn J. Twitchell
Will H. Dodge

Inventor:
W. M. Woodbury
By his Attys,
Dodge & Son

UNITED STATES PATENT OFFICE.

WILLIAM M. WOODBURY, OF ROCHESTER, MINNESOTA.

IMPROVEMENT IN GRINDING-MILLS.

Specification forming part of Letters Patent No. 185,200, dated December 12, 1876; application filed April 6, 1876.

*To all whom it may concern:*

Be it known that I, WILLIAM M. WOODBURY, of Rochester, Olmsted county, Minnesota, have invented certain new and useful Improvements in Grinding-Mills, of which the following is a specification:

My invention consists in sustaining the bed-stone by springs, in such manner that it can move or yield both vertically and laterally, in order to adapt itself to the face of the runner-stone. In carrying out my invention I propose to apply the springs in any suitable manner which will admit of the lower stone yielding or giving in all directions, but it is preferred to seat the stone upon three rubber blocks, and to encircle it with a continuous band of rubber seated in the frame, as shown in the accompanying drawings, in which—

Figure 1:
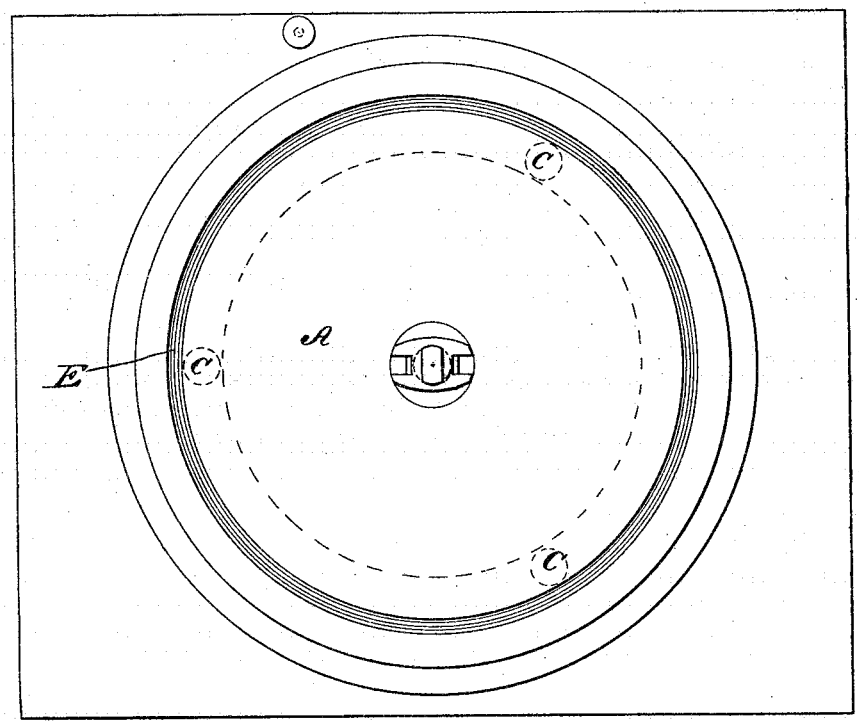
Figure 2:
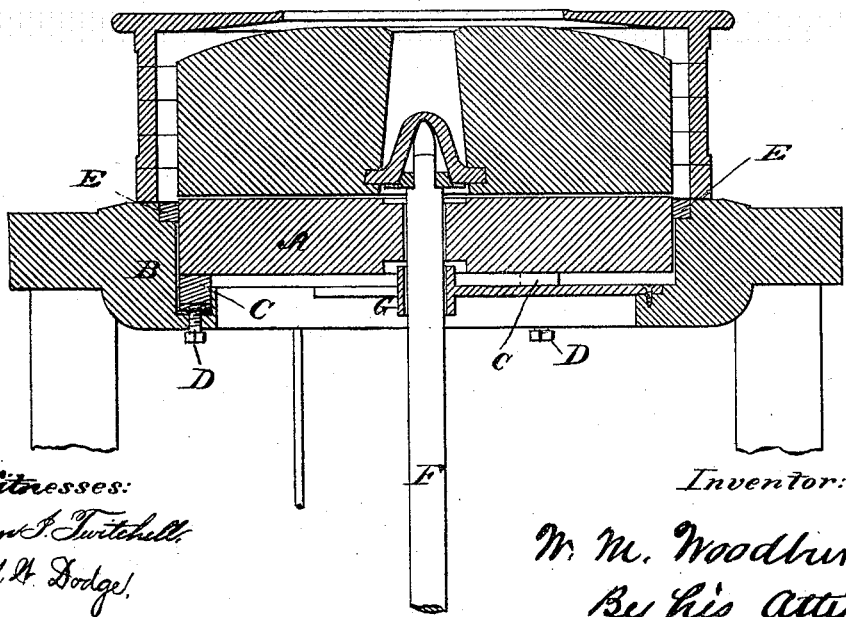

Figure 1 represents a top plan view of a bed-stone mounted on my plan; Fig. 2, a vertical central section of a mill or run of stones with my improvements embodied therein.

A represents the lower stationary stone; B, the supporting frame or husk; C, three rubber springs seated in the frame at equal distances apart under the outer edges of the lower stone, to support the same; D, bolts mounted in the frame and bearing under the springs C, for the purpose of raising the same and adjusting the stone; E, a continuous rubber spring or band encircling the stone, and seated in a groove in the frame, in order to retain the stone in place, but at the same time admit of its moving laterally; F, the spindle of the runner-stone, and G the spindle-bearing, secured to the frame below the bed-stone, so that the spindle will not be affected by the lateral movement of the lower stone, the eye of which is made of such size as to leave a space around the spindle. By the combination of the springs below the bed-stone, and that around its periphery, it is held from moving accidentally, and retained with sufficient firmness to insure the proper grinding action, and at the same time permitted to yield in every direction under the influence of the runner-stone, whereby excessive pressure of one stone upon the other at any one point is prevented, the heating of the stones avoided, and a uniform granulation of the material secured.

Having thus described my invention, what I claim is—

1. The combination of a millstone with sustaining-springs beneath and on the periphery thereof, substantially as shown, whereby the stone is permitted to yield both vertically and laterally.

2. In combination with the stone A, the springs C and E, arranged as shown.

3. In combination with the stone A, the rubber springs C, seated in the frame B, and sustained by the screws D.

WM. M. WOODBURY.

Witnesses:
C. T. BENEDICT,
GEO. W. BAKER.